Patented Oct. 21, 1924.

1,512,414

UNITED STATES PATENT OFFICE.

JOHN FOLEY, OF WAYNE, PENNSYLVANIA.

WOOD-PRESERVING EMULSION.

No Drawing.  Application filed November 22, 1921. Serial No. 516,987.

*To all whom it may concern:*

Be it known that I, JOHN FOLEY, a citizen of the United States, residing at Wayne, county of Delaware, State of Pennsylvania, have invented certain new and useful Improvements in Wood-Preserving Emulsions, of which the following is a specification.

This invention relates to a liquid for use in the preservative treatment of wood and particularly to an emulsion for impregnating wood fiber to prevent the entrance and growth of wood-destroying fungi. The object of this invention is to provide an emulsion which will be permanent and which will continue stable in aqueous surroundings.

Water-soluble salts have long been used in the preservative treatment of wood, but their lack of permanency has interfered with their efficiency. Zinc-chloride, for example, will leach whenever wood into which it has been injected comes in contact with water, and, being deliquescent, it drains away in humid atmosphere. The object of this invention is to prevent the leaching of zinc-chloride or other toxic salt through providing a moisture-resistive retainer which will confine the salt within the wood.

To provide a wood preservative in which the fungicidal properties of zinc chloride, sodium fluoride, copper sulphate, mercuric chloride, or like toxic chemical are permanent, the salts are first dissolved by a suitable solvent other than water and then emulsified with petroleum or shale oil in proportions suitable for the service required which mixture should be in such proportion that the specific gravity of the solution will be approximately the same as the specific gravity of oil. When toxic salts are so dissolved in a suitable solvent and the resultant solution is properly combined with a satisfactory oil, the resultant emulsion will not saponify or coagulate in the operations of impregnating wood. The object of the solution of toxic salt is to serve as a medium for carrying the oil in suspension and for diffusing it throughout the cells and vessels of the wood and also as a water-resistive coating for the walls of the cells and vessels of the wood. In other words, the salt solution spreads the oil through the wood. The advantage is that a more stable emulsion is obtained, that is, by mixing petroleum and an alcoholic solution of zinc chloride or similar salt rather than by using a water solution because the specific gravity of the commercial alcohol and petroleum are closer together and the salt will not leach out when the wood is exposed to water or a humid atmosphere.

The wood-preserving emulsion described above may be deeply injected into forest products under atmospheric, pneumatic, or hydraulic pressure in a closed treating vessel or superficially absorbed by application in any other manner.

Where alcohol is used as the solvent of the toxic salt in the wood-preserving emulsion, the alcohol may be recovered before the wood is removed from the treating vessel by evaporation and condensation, at temperatures which will not injure the wood, without impairing the efficacy of the emulsion as a wood preservative.

What I claim is:

1. A wood preserving emulsion formed by dissolving chloride of zinc by means of a solvent which forms with oil a more stable emulsion than water and mixing the resultant chloride of zinc solution with petroleum.

2. A wood preserving emulsion formed by dissolving toxic salt by means of a solvent which forms with oil a more stable emulsion than water and mixing the resultant toxic salt solution with petroleum.

3. A wood preserving emulsion formed by dissolving chloride of zinc by means of a solvent which forms with oil a more stable emulsion than water and mixing the resultant chloride of zinc solution with crude mineral oil.

4. A wood preserving emulsion formed by dissolving a toxic salt by means of a solvent which forms with oil a more stable emulsion than water and mixing the resultant toxic salt solution with crude mineral oil.

In testimony whereof, I set my hand, this 3rd day of November, 1921.

JOHN FOLEY.